United States Patent [19]
Lenning

[11] 3,805,546
[45] Apr. 23, 1974

[54] ABSORPTION REFRIGERATION APPARATUS HAVING GENERATOR STRUCTURE FOR STRATIFYING AND REDUCING AGITATION OF ABSORPTION SOLUTION IN A DOWNWARDLY FLOWING LIQUID COLUMN IN WHICH EXPELLED VAPOR BUBBLES UPWARDLY THERETHROUGH

[75] Inventor: Karl Alvar Lenning, Stockholm, Sweden

[73] Assignee: Aktiebolaget Electrolux, Stockholm, Sweden

[22] Filed: July 27, 1972

[21] Appl. No.: 275,788

[52] U.S. Cl.................. 62/496, 62/497, 261/114 A
[51] Int. Cl.............................................. F25b 15/04
[58] Field of Search............ 62/490, 495, 496, 497; 261/114 A

[56] References Cited
UNITED STATES PATENTS

| | | | |
|---|---|---|---|
| 3,323,323 | 6/1967 | Phillips | 62/497 |
| 3,464,221 | 9/1969 | Stierlin et al. | 62/490 X |
| 1,613,627 | 1/1927 | Von Platen et al. | 62/497 |
| 2,161,875 | 6/1939 | Lenning | 62/497 X |
| 3,367,137 | 2/1968 | Whitlow | 62/497 |

Primary Examiner—William F. O'Dea
Assistant Examiner—Peter D. Ferguson
Attorney, Agent, or Firm—Edmund A. Fenander

[57] ABSTRACT

In absorption refrigeration apparatus having structure of annular form retaining a column of absorption solution in which solution flows downward in counterflow to vapor expelled from solution and flowing upward therethrough, a plurality of bell-shaped members disposed one above another within the structure for stratifying and materially reducing agitation of the liquid in the column due to vapor bubbling upward therethrough.

The bell-shaped members, the tops of which are apertured, provide a path of flow for downwardly flowing solution at the outer periphery of a bell-shaped member and then transversely thereof in such bell-shaped member and downwardly again at the outer periphery of the next lower bell-shaped member. A pressure is developed in the bell-shaped members which counteracts the upward flow of vapor through their apertured tops so that vapor will collect in spaces within the bell-shaped members above the liquid levels therein.

4 Claims, 4 Drawing Figures

PATENTED APR 23 1974

ABSORPTION REFRIGERATION APPARATUS HAVING GENERATOR STRUCTURE FOR STRATIFYING AND REDUCING AGITATION OF ABSORPTION SOLUTION IN A DOWNWARDLY FLOWING LIQUID COLUMN IN WHICH EXPELLED VAPOR BUBBLES UPWARDLY THERETHROUGH

BACKGROUND OF THE INVENTION

1. Field of the Invention

This invention relates to absorption refrigeration apparatus in which vapor bubbles upward through a column of downwardly flowing absorption solution in counterflow thereto. Generators or boilers of absorption refrigeration systems constitute apparatus of this kind in which heat is applied to expel refrigerant vapor out of absorption solution, such expelled vapor ascending in a column of the solution which flows downward in counterflow to the upwardly flowing vapor.

2. Description of the Prior Art

When refrigerant vapor is expelled out of solution in a boiler or generator by applying heat thereof, there is a tendency for vapor of absorption liquid to accompany the refrigerant vapor. When absorption liquid is vaporized in the generator or boiler and condenses in other parts of the apparatus, this represents a heat loss.

In order to reduce to a minimum the quantity of vapor of absorption liquid accompanying the refrigerant vapor, it is desirable to stratify liquid and reduce agitation thereof due to vapor bubbling upward therethrough. This has been accomplished heretofore by employing in an upright conduit a number of plates one above another which are sieve-like in character. The upright conduit, which may be referred to as a boiler or generator, is heated to expel vapor out of solution therein. A pump or vertical tube, which also may be heated, raises liquid into the upper part of the boiler by vapor-liquid lift action. The liquid introduced into the boiler in this manner flows downwardly therein counterflow to vapor bubbling upward through the liquid.

When the boiler is cold the liquid surface therein is at a level corresponding to the level of the liquid at the upper part of the absorber. When the boiler is heated to start operation of the refrigeration system, the liquid level in the boiler rises a little due to the difference in density between cold solution in the absorber side of the absorption solution circuit and heated solution in the boiler side of the circuit. When the solution in the boiler is boiling and the vapor-liquid lift pump is functioning, the liquid level in the boiler rises further for a distance which is primarily dependent on the lifting action exerted by the vapor flowing upwardly through the structure functioning to stratify the liquid.

It is important that the distance the liquid level in the boiler rises in this manner, which may be referred to as "loss height," is not allowed to grow without control because under such operating conditions, especially when the rate at which heat is supplied to the boiler is relatively great, the "loss height" can increase to a level above the point at which liquid is introduced into the boiler from the upper end of the vapor-liquid lift tube or pump pipe. This is objectionable because under such operating conditions, the vapor-liquid tube will malfunction and the refrigeration system will cease to operate. In addition, it is important for structural reasons to keep the loss height at a minimum.

Further, it also has been the practice heretofore, in order to insure that the loss height will be as low as possible, to provide openings in the plates of sieve-like character which are relatively large and have a diameter in a range of about 2.20 to 3.00 mm. However, this is objectionable for the reason that the liquid in the boiler, at the regions above and below the plates of sieve-like character, will mix too quickly and cause spontaneous circulation or surges of liquid in the boiler. This impairs the efficiency of the structure serving to stratify the liquid which in turn reduces the efficiency of the boiler.

The objections referred to above also apply to a certain extent to another form of stratifier comprising a roll of wire netting. This is true in spite of the fact that the loss height that occurs when wire netting is employed is less than that resulting when plates of sieve-like character are employed.

It will be readily understood that the shortcomings of the structures referred to above and heretofore employed to stratify liquid and reduce agitation of liquid in the boiler or generator is due primarily to the fact that a single passageway is provided for the upward flow of vapor and downward flow of liquid. With this arrangement each of these fluids tends to obstruct the flow of the other fluid.

SUMMARY OF THE INVENTION

It is an object of my invention to provide an improved structure for stratifying and reducing agitation of absorption solution in a downwardly flowing column of such solution due to vapor bubbling upward therethrough.

Another object is to provide an improved boiler or generator for absorption refrigeration systems in which a minimum quantity of vapor of absorption liquid accompanies the refrigerant vapor expelled from absorption solution by heating.

I accomplish this by providing structure for stratifying and reducing agitation of absorption solution which comprises a plurality of bell-shaped members which are disposed one above another within a vertical passageway defined by the structure. The bell-shaped members, the tops of which are apertured, provide a path of flow for downwardly flowing solution at the outer periphery of a bell-shaped member and then transversely within such bell-shaped member and downwardly again at the outer periphery of the next lower bell-shaped member.

An important feature of my invention is that a pressure is developed in the bell-shaped members which counteracts the upward flow of vapor through their apertured tops and results in vapor collecting in spaces within the bell-shaped members above the liquid levels therein.

This counterpressure can be generated by capillary forces in the apertures in the top of the bell-shaped members. The counterpressure effects a fine distribution of the vapor flowing upward through the apertures and the vapor collecting in the spaces within the bell-shaped members depresses the bodies of liquid therein with the liquid surfaces at such levels that there is no liquid communication through the apertures in the tops of the bell-shaped members. This is especially important in boilers and generators of absorption refrigeration systems in which it is desirable to keep the loss height at a minimum.

DESCRIPTION OF THE PREFERRED EMBODIMENT

Figure 1:
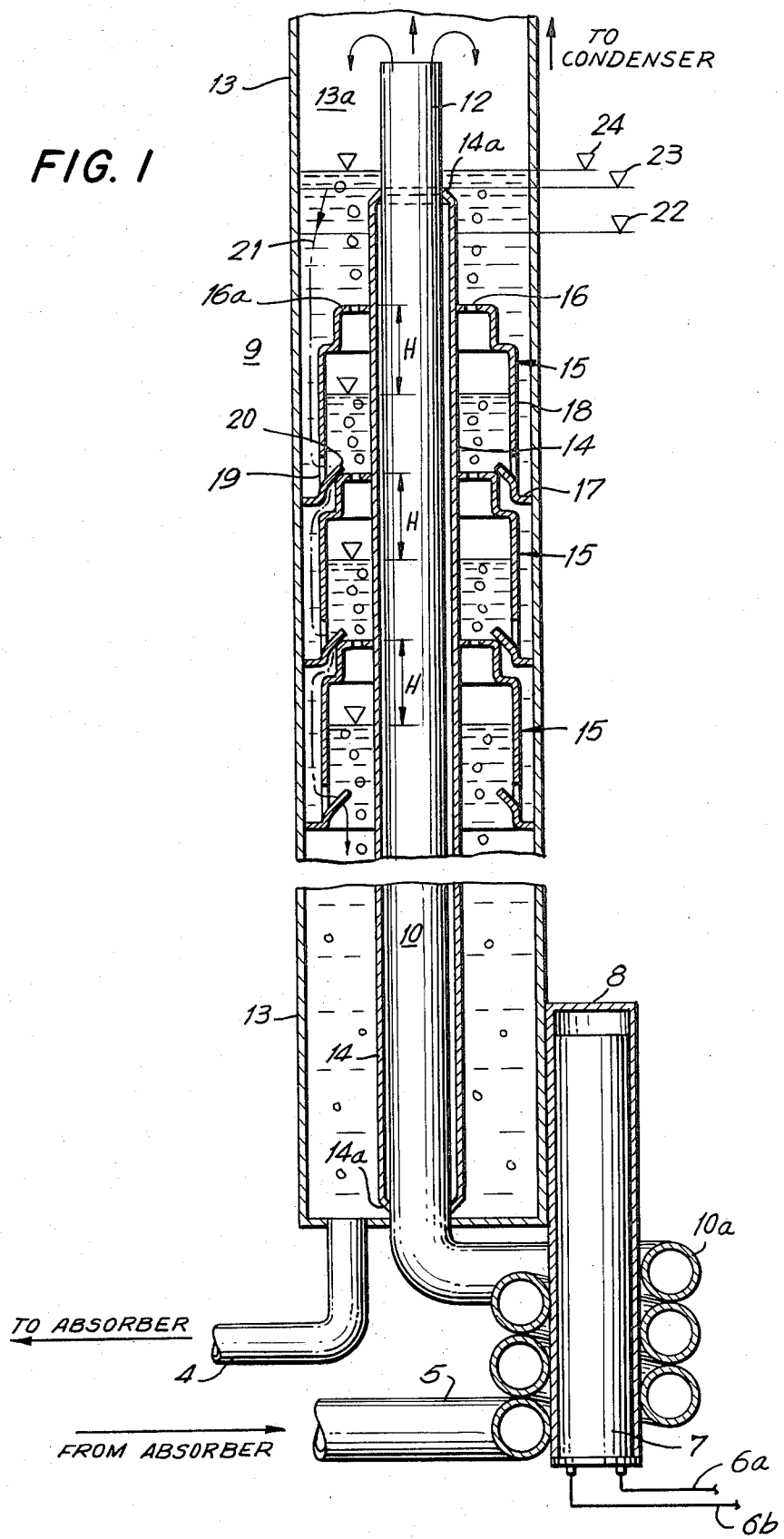
FIG. 1 is a fragmentary vertical sectional view of a boiler or generator of an absorption refrigeration system embodying my invention.

The present invention is embodied in an absorption refrigeration system of a uniform pressure type like that described in my U.S. Pat. No. 2,206,411, granted July 2, 1940. Absorption refrigeration systems of this type contain an inert gas or pressure equalizing fluid and includes a generator or boiler, a condenser, an evaporator and an absorber which are interconnected for circulation of refrigerant, absorption liquid and inert gas.

The disclosure in my aforementioned patent may be considered as being incorporated in this application, and, if desired, reference may be made thereto for a detailed description of the refrigeration system. In such a system refrigerant expelled from absorption solution in a generator or boiler by heating and liquefied in a condenser flows into an evaporator in which the liquid, such as ammonia, evaporates and diffuses in the presence of an inert gas, such as hydrogen, thereby producing a refrigerating effect.

The resulting gas mixture of refrigerant and inert gas flows from the evaporator into an absorber in which refrigerant vapor is absorbed into liquid absorbent, such as water. Inert gas weak in refrigerant circulates in an inert gas circuit which includes the evaporator and absorber and returns to the evaporator. Absorption liquid enriched in refrigerant in the absorber flows to the generator where it is heated and refrigerant is again expelled out of solution. The weakened absorption liquid from which refrigerant has been expelled flows from the generator the absorber to again absorb refrigerant vapor.

In order to simplify the drawing, the condenser, evaporator and absorber and connections therebetween have not been shown, such parts being well known and their illustration not being necessary for an understanding of my invention. As pointed out above, reference may be made to my aforementioned patent for a detailed description of these parts of the refrigeration system.

Referring to FIG. 1, I have shown my invention embodied in a generator or boiler 9 of an absorption refrigeration system like that referred to above. The generator 9 comprises a vertical conduit 13 within which is concentrically disposed a vapor-liquid lift tube or pump pipe 10. A heating tube 8, which is heat conductively connected to the lower part of conduit 13 in any suitable manner, as by welding, includes a downward extending portion about which disposed a coil 10a forming the lower end of the vapor-liquid lift tube 10. An electrical heating element 7, which is connected by electrical conductors 6a and 6b to a suitable source of electrical energy, snugly fits in the heating tube 8.

Absorption solution enriched in refrigerant flows from the absorber in a path of flow which includes a conduit 5 and coil 10a. Due to heating of coil 10a by the heating tube 8 solution is raised by vapor-liquid lift action through the lift tube or pump pipe 10. The heating tube 8 also heats absorption solution in the lower part of the conduit 13 and expels vapor therefrom which bubbles upward through solution in the conduit. The liberated ammonia vapor entering the upper part 13a of the conduit 13, together with ammonia vapor expelled from solution in the conduit 13, flows upward therefrom to the condenser, as explained above.

The absorption solution flows downward in the conduit 13 and solution weak in ammonia flows from the lower part of the conduit 13 to the absorber in a path of flow which includes a conduit 4. About the lift tube or pump pipe 10 is disposed an insulating pipe 14 which is spaced therefrom and fixed at its ends at 14a to the pump pipe 10.

In accordance with my invention the generator 9 is so constructed and arranged that the absorption solution flowing downward therein is effectively stratified and agitation thereof, due to vapor bubbling upward therethrough, is reduced. In this way the quantity of absorption liquid vapor accompanying refrigerant vapor expelled from solution and flowing to the condenser is reduced to a minimum. I accomplish this by providing within the conduit 13 a plurality of bell-shaped members 15 which are disposed one above another.

The bell-shaped members 15 include tops 16a having apertures 16 therein and outwardly extending flanges or collars 17 at their lower ends which serve to guide the members 15 into position one above another within the conduit 13 and enable the apertured tops 16a to be positioned rather closely to the insulating pipe 14.

The bell-shaped members 15 include cylindrical-shaped portions 18 which are vertically disposed between the apertured tops 16a and the collars 17. The cylindrical-shaped portions 18, at regions above the collars 17, are formed with openings 19 by punching out wall portions 20 which are deflected inward at an acute angle to the vertical and rest against the apertured top 16a of the next lower bell-shaped member 15. This provides a path of flow for downwardly flowing liquid at the outer periphery of a bell-shaped member 15 and thence transversely within the member after passing through the ports 19. From the interior of the member 15 liquid then flows downwardly between two adjacent members 15 and at the outer periphery of the next lower member, as indicated by the arrowed dot-dash line 21 in FIG. 1. It will be seen that this downward flow of liquid between adjacent members 15 is effected through a gap formed between the apertured top 16a of each member and the lower open end of the member immediately above it.

At the same time vapor expelled from solution in conduit 13 bubbles upward through the downwardly flowing liquid. The vapor bubbles within the bell-shaped members 15 effect a practically complete equalization of concentration and temperature during the downward flow of the liquid within the members. The collars 17 serve to prevent liquid from flowing vertically downward and in a straight line within the conduit. However, a moderate amount of play between the collars 17 of the members 15 and the conduit 13 is allowable. This facilitates the fabrication of the generator 9 and makes it less expensive to manufacture.

It is imperative that the liquid flowing within the bell-shaped members 15 does not fill the interiors thereof. This would cause spontaneous circulation of liquid within and exteriorly of the members 15 and cause the bell-shaped members to malfunction. Such detrimental circulation of liquid is effectively avoided by providing apertures 16 in the apertured tops 16a which have such a small diameter that capillary forces will act in the apertures 16 with the passage of vapor bubbles therethrough. By way of example, the diameters of the apertures desirably are in a range of 1.0 to 2.0 mm. These capillary forces function to cause the liquid levels in the members 15 to form at a distance H from the apertured tops 16a thereof and in a range of from 3 to 6 mm.

It will be understood that by depressing the liquid levels in the members 15 in the manner just explained loss height in the boiler 9 will not develop. This is so because the passageway for downwardly flowing liquid between the outer peripheries of the bell-shaped members 15 and the conduit 13 is free of any upwardly flowing vapor. Therefore, the loss height is reduced to practically nil substantially independently of the rate at which heat is supplied to the generator 9.

When the generator 9 in FIG. 1 is at ambient temperature and out of operation the liquid surface level in the conduit 13 is indicated at 22. When operation of the refrigeration system is initiated and heat is supplied to the conduit 13, heating of liquid therein raises the liquid surface to the level indicated at 23. When the pump pipe 10 begins to function due to heating of coil 10a thereof, liquid is raised to the upper part 13a of the conduit 13 and the liquid level will rise to the level indicated at 24. In FIG. 1 it will be seen that the loss height between the levels 23 and 24 is comparatively small.

Figure 2:
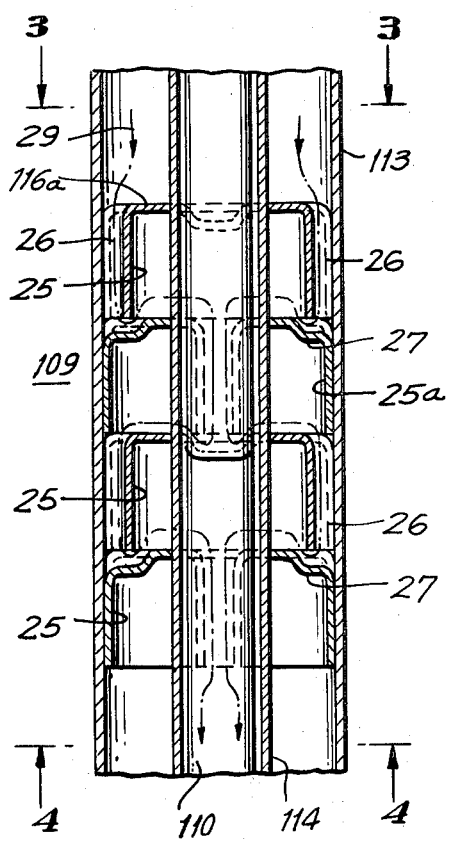
FIG. 2 is a fragmentary vertical sectional view similar to FIG. 1 illustrating another embodiment of my invention.
Figure 3:
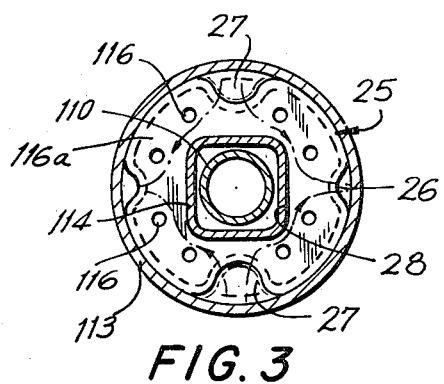
FIGS. 3 and 4 are sectional views taken at lines 3—3 and 4—4 of FIG. 2.
Figure 4:
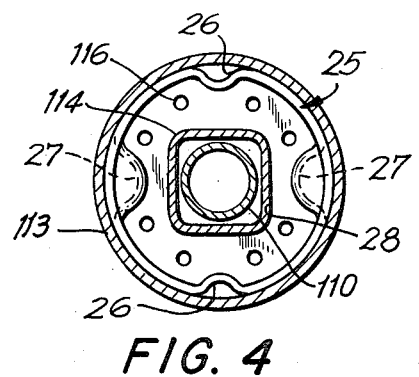

FIGS. 2, 3 and 4 illustrate another embodiment of my invention in which parts similar to those shown in FIG. 1 and just described are referred to by the same reference numerals to which 100 has been added. In FIG. 2 a pump pipe 110 is concentrically disposed within a conduit 113 and enveloped by an insulating pipe 114 in spaced relation thereto in the same manner as in FIG. 1. A plurality of bell-shaped members 25 are disposed one above another within the conduit 113. The side wall 25a of each member 25 is indented lengthwise thereof at diametrically opposed regions to form a pair of grooves 26 at its outer periphery. The grooves 26 form the passageway for downwardly flowing liquid within the conduit 113 and take the place of the passageway in FIG. 1 between the outer periphery of the bell-shaped members 15 and the conduit 13.

The tops 116a of the bell-shaped members 25, at their outer peripheral portions, are formed with depressed areas or regions 27 which are diametrically opposite one another and at 90° or at right angles to the grooves 26. Further, the tops 116a are apertured at 116 and formed with non-circular openings 28. The insulating pipe 114 in FIG. 2 also is non-circular and in cross-section has a configuration similar to that of the openings 28.

In assembling the generator 109 in FIG. 2, the bell-shaped members 25 are inserted into position on the pump pipe 110 with each member 25 at a right angle or 90° with respect to the preceding member 25. The downward path of movement of liquid in FIG. 2 is indicated by the arrowed dot-dash lines 129. It will be seen that liquid flows downward through the vertical grooves 26 in one bell-shaped member 25 and then almost horizontally through the depressed areas or regions 27 into the interior of the member 25. Thereafter, the liquid continues to flow downward through the grooves 26 in the next lower bell-shaped member 25 which are at right angles to the grooves 26 of the member 25 immediately above it. Liquid continues to flow downward in this manner past all of the members 25 in the conduit 113 while expelled vapor bubbles upward through the liquid in the same manner shown in FIG. 1 and described above.

In the application of my invention to absorption refrigeration systems of the type referred to above enriched absorption solution is introduced into the upper part of the generator or boiler and during its downward flow becomes progressively hotter and also progressively weaker due to expulsion of vapor therefrom. The effectiveness of means provided to promote stratification of downwardly flowing absorption solution can be readily determined by measuring the difference in temperature that is developed and maintained between the hot absorption solution in the lower part of the stratifier and the somewhat colder solution in the upper part of the stratifier. In my improved stratifier this temperature difference is of the order of 50°C which is exceedingly good and insures that the stratifier will carry out its intended function. When the temperature difference is in the neighborhood of 20°–25°C this indicates the stratifier is not capable of carrying out its intended function and is deficient.

Hence, in my improved stratifier the vapor of absorption liquid contained in the ascending bubbles of ammonia vapor formed in the lower or hotter parts of the generator is effectively condensed as it passes through the cooler layers of absorption solution at the upper part of the generator. This effectively reduces the heat loss in absorption refrigeration systems which otherwise occurs when absorption solution is vaporized in the generator or boiler and, instead of condensing in the cooler layers of solution in the upper part of the generator, condenses in other parts of the system.

I claim:

1. In absorption refrigeration apparatus, a generator comprising
   a. conduit means defining a vertical space for holding a body of absorption solution,
   b. said conduit means having a heat receiving part adapted, when heat is applied thereto, to expel vapor from the absorption solution,
   c. means for flowing absorption solution to the upper part of said conduit means and for withdrawing absorption solution from the lower part of said conduit means, whereby absorption solution flows downward through said vertical space in a path of flow in counterflow to upwardly flowing vapor, and
   d. structure to promote stratification of absorption solution in said vertical space comprising a plurality of bell-shaped members disposed one above another within said conduit means, the tops of said bell-shaped members being apertured,
   e. said bell-shaped members being shaped to provide a path of flow for downwardly flowing absorption solution at the outer periphery of a bell-shaped member and then transversely thereof in said bell-shaped member and downwardly again at the outer periphery of the next lower bell-shaped member, and f. said bell-shaped members being so constructed and formed that a pressure is developed which counteracts the upward flow of vapor through the apertured tops of said bell-shaped members whereby vapor collects in spaces within said bell-shaped members above the liquid levels therein, g. the side walls of said bell-shaped members being indented lengthwise thereof to form grooves at their outer peripheries, the path of flow for downwardly flowing solution including said grooves.

2. Apparatus as set forth in claim 1 in which the side walls of said members are indented lengthwise thereof at diametrically opposed regions to form pairs of said grooves at their outer peripheries.

3. Apparatus as set forth in claim 2 in which the pair of grooves in the wall of each of said members is at a right angle to the pair of grooves in the wall of said member above it.

4. Apparatus as set forth in claim 3 in which the tops of said members at their outer peripheral portions are formed with depressed areas which are diametrically opposite one another and at right angles to the pairs of said grooves extending vertically downward from the tops of said members.

* * * * *

UNITED STATES PATENT OFFICE
CERTIFICATE OF CORRECTION

Patent No. 3,805,546      Dated April 23, 1974

Inventor(s) KARL ALVAR LENNING

It is certified that error appears in the above-identified patent and that said Letters Patent are hereby corrected as shown below:

On the cover sheet insert

--[30] Foreign Application Priority Data

July 28, 1971      Sweden      9668/71

Signed and sealed this 10th day of September 1974.

(SEAL)
Attest:

McCOY M. GIBSON, JR.      C. MARSHALL DANN
Attesting Officer      Commissioner of Patents

UNITED STATES PATENT OFFICE
CERTIFICATE OF CORRECTION

Patent No. 3,805,546                              Dated  April 23, 1974

Inventor(s)  KARL ALVAR LENNING

It is certified that error appears in the above-identified patent and that said Letters Patent are hereby corrected as shown below:

On the cover sheet insert

--[30] Foreign Application Priority Data

July 28, 1971        Sweden         9668/71

In the Drawings

Figure 6:
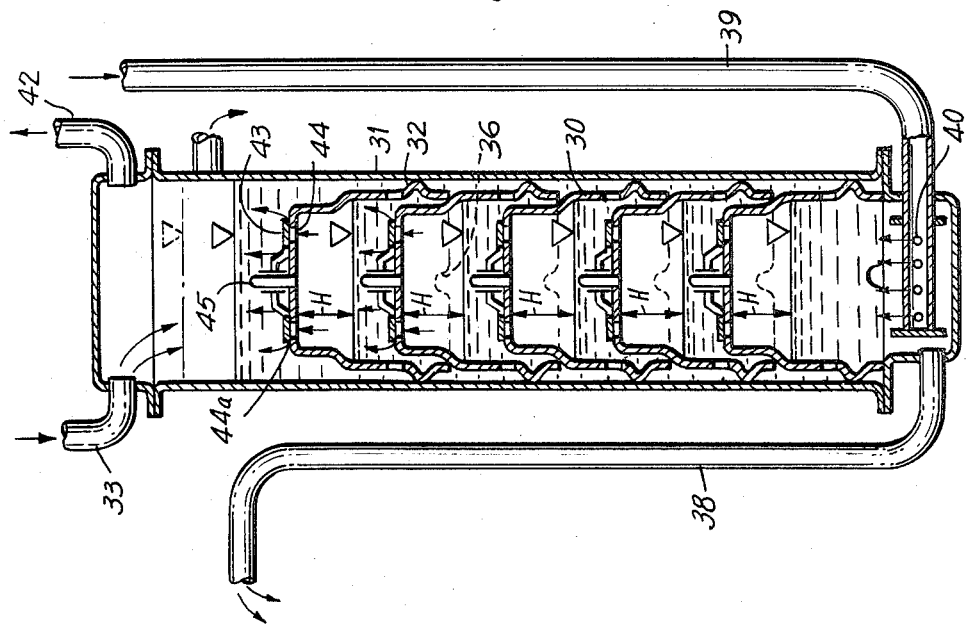
Figure 5:
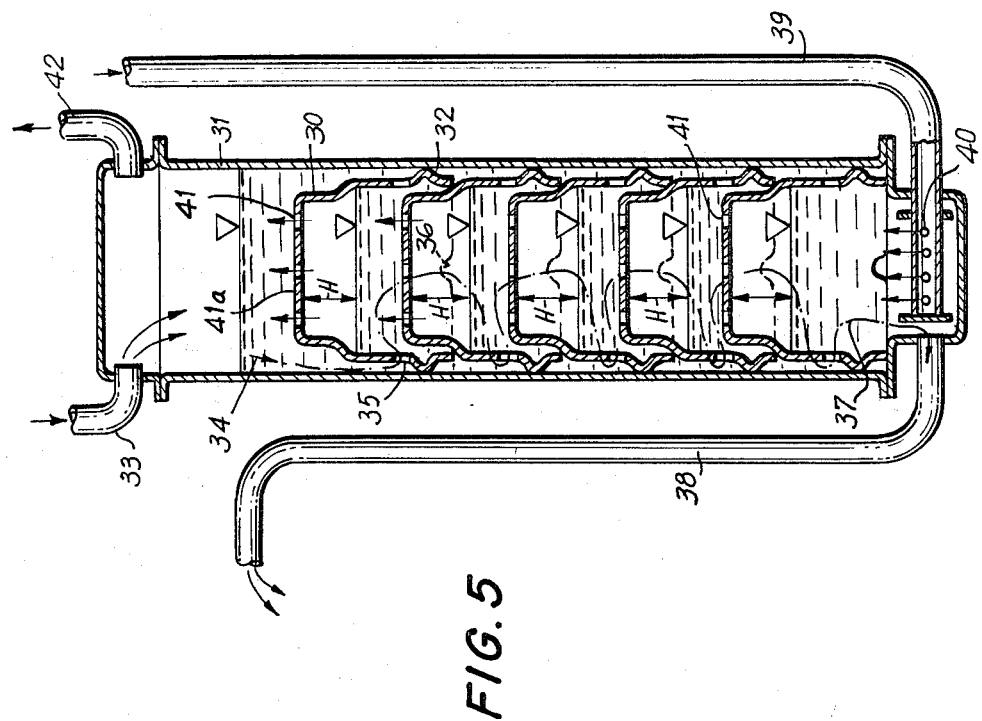

Cancel Figs. 5 and 6 --

Signed and sealed this 29th day of October 1974.

(SEAL)
Attest:

McCOY M. GIBSON JR.
Attesting Officer

C. MARSHALL DANN
Commissioner of Patents